US012703656B2

(12) United States Patent
Han et al.

(10) Patent No.: US 12,703,656 B2
(45) Date of Patent: Aug. 11, 2026

(54) PHASE-SEPARATED GLASS AND PREPARATION METHOD THEREOF, TEMPERED GLASS AND PREPARATION METHOD THEREOF, HOUSING OF ELECTRONIC DEVICE, DISPLAY OF ELECTRONIC DEVICE, AND ELECTRONIC DEVICE

(71) Applicant: Honor Device Co., Ltd., Shenzhen (CN)

(72) Inventors: Shuai Han, Shenzhen (CN); Wenbin Xu, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 538 days.

(21) Appl. No.: 18/252,045

(22) PCT Filed: Sep. 6, 2022

(86) PCT No.: PCT/CN2022/117321
§ 371 (c)(1),
(2) Date: May 8, 2023

(87) PCT Pub. No.: WO2023/071539
PCT Pub. Date: May 4, 2023

(65) Prior Publication Data

US 2024/0002275 A1 Jan. 4, 2024

(30) Foreign Application Priority Data

Oct. 28, 2021 (CN) ......................... 202111265999.9

(51) Int. Cl.
*C03C 3/087* (2006.01)
*C03C 3/091* (2006.01)
(Continued)

(52) U.S. Cl.
CPC .............. *C03C 3/087* (2013.01); *C03C 3/091* (2013.01); *C03C 3/095* (2013.01); *C03C 3/097* (2013.01); *C03C 21/002* (2013.01)

(58) Field of Classification Search
None
See application file for complete search history.

(56) References Cited

U.S. PATENT DOCUMENTS 4,165,222 A * 8/1979 De Panafieu ........... C03C 3/089 65/427
2007/0290170 A1 12/2007 Ding
(Continued)

FOREIGN PATENT DOCUMENTS

CN 1919763 A 2/2007
CN 101108769 A 1/2008
(Continued)

OTHER PUBLICATIONS

Geleil A.S. et al., "Doped Low Tg glasses as phosphor Materials," Physics and Chemistry of Glasses, vol. 46 No. 4, Aug. 1, 2005, ISSN:0031-9090, 8 pages.

*Primary Examiner* — David Sample
(74) *Attorney, Agent, or Firm* — Conley Rose, P.C.

(57) ABSTRACT

This application provides phase-separated glass prepared from basic glass through phase separation. This application further provides tempered glass prepared from basic glass by sequentially performing phase separation and chemical strengthening. This application further provides a method for preparing the phase-separated glass, a method for preparing the tempered glass, a housing that is of an electronic device and that includes the phase-separated glass or the tempered glass, a display of an electronic device, and an electronic device. In this application, phase separation is performed on the basic glass to form two-phase mixed phase-separated glass that includes an alkali-boron-rich
(Continued)

(a)

(b)

separated phase and a silicon-rich separated phase. The phase-separated glass can prevent micro-cracks in the glass from propagating, thereby improving mechanical properties such as fracture toughness of the glass and then improving anti-drop performance of the glass.

19 Claims, 2 Drawing Sheets

(51) Int. Cl.

*C03C 3/095* (2006.01)
*C03C 3/097* (2006.01)
*C03C 21/00* (2006.01)

(56) References Cited

U.S. PATENT DOCUMENTS

| | | | |
|---|---|---|---|
| 2010/0139748 | A1 | 6/2010 | Ding |
| 2012/0212962 | A1 | 8/2012 | Yasumori et al. |
| 2016/0200624 | A1 | 7/2016 | Mushiake et al. |
| 2020/0156994 | A1 | 5/2020 | Li et al. |

FOREIGN PATENT DOCUMENTS

| | | | |
|---|---|---|---|
| CN | 101752443 | A | 6/2010 |
| CN | 105377786 | A | 3/2016 |
| TW | 201602042 | A | 1/2016 |

* cited by examiner

PHASE-SEPARATED GLASS AND PREPARATION METHOD THEREOF, TEMPERED GLASS AND PREPARATION METHOD THEREOF, HOUSING OF ELECTRONIC DEVICE, DISPLAY OF ELECTRONIC DEVICE, AND ELECTRONIC DEVICE

CROSS-REFERENCE TO RELATED APPLICATIONS

This application is a U.S. National Stage of International Application No. PCT/CN2022/117321 filed on Sep. 6, 2022, which claims priority to Chinese Patent Application No. 202111265999.9, filed with the China National Intellectual Property Administration on Oct. 28, 2021, both of which are incorporated herein by reference in its their entireties.

TECHNICAL FIELD

This application relates to the field of electronic device technologies, and in particular, to phase-separated glass and a preparation method thereof, tempered glass and a preparation method thereof, a housing of an electronic device, a display of an electronic device, and an electronic device.

BACKGROUND

Since the advent of smartphones, a material of a cover has gradually developed from a plastic material to a glass material, and glass in a backplane material has stood out from many materials, such as plastics, metals, and ceramics, because of its advantages such as sufficient wear resistance, plasticity, high cost performance, and support for wireless charging, and has become a mainstream choice for medium- and high-end mobile phones. However, glass has a major disadvantage, that is, poor anti-drop performance. To improve anti-drop performance of mobile phone glass, the industry has improved and optimized the glass mainly from two aspects: one is to improve a glass composition, which has gradually developed from soda-lime silicate glass to high aluminosilicate glass, as well as super ceramic crystal glass in recent years; and the other is to optimize a chemical strengthening process of glass, which has developed an ion exchange process from a one-step method to a two-step method and a multi-step method. The super ceramic crystal glass is glass-ceramics, which improve fracture toughness ($K_{1C}$) and anti-drop performance of glass by using a micro-crystal phase in the glass. Fracture toughness is used to represent a capability of a material in resisting crack propagation, and crack propagation is related to stress concentration at a crack tip on a material surface. Glass-ceramics slow down stress concentration at a crack tip by using nano-sized microcrystalline particles in the glass, and deflect to hinder micro-crack propagation, thereby improving anti-drop performance of glass.

SUMMARY

This application provides phase-separated glass and a preparation method thereof, tempered glass and a preparation method thereof, a housing of an electronic device, a display of an electronic device, and an electronic device, to improve fracture toughness and anti-drop performance of glass, so as to resolve the problem that glass is not resistant to drop when being used to produce a housing of an electronic device or an external screen of a display.

To achieve the foregoing object, the following technical solutions are used in this application:

This application provides phase-separated glass prepared from basic glass through phase separation, where the basic glass includes:

0~5 mol % of $Al_2O_3$;
30 mol %~65 mol % of $SiO_2$+$Al_2O_3$;
0~2 mol % of $P_2O_5$;
30 mol %~60 mol % of $B_2O_3$+$P_2O_5$;
0~7 mol % of $Li_2O$;
0~5 mol & of $K_2O$;
0~3 mol % of MgO;
0~3 mol % of CaO;
0~10 mol % of $Li_2O$+$K_2O$+MgO+CaO;
5 mol %~20 mol % of $Na_2O$+$Li_2O$+$K_2O$+MgO+CaO;
0~1 mol % of $ZrO_2$;
0~1 mol % of $GeO_2$;
0~1 mol % of $MnO_2$;
0~1 mol % of CuO;
0~1 mol % of $Re_2O_3$; and
0~3 mol % of $ZrO_2$+$GeO_2$+$MnO_2$+CuO+$Re_2O_3$.

In this application, phase separation s performed on the basic glass with the foregoing composition to form two-phase mixed phase-separated glass that includes an alkali-boron-rich separated phase and a silicon-rich separated phase. The phase-separated glass can hinder micro-cracks in the glass from propagating, thereby improving mechanical properties such as fracture toughness of the glass and then improving anti-drop performance of the glass. Experimental results show that after phase separation, the glass according to the present invention had fracture toughness of 1.0 $MPa \cdot m^{1/2}$ or more, which was improved by 20% or more compared with that of glass without phase separation; and a ball drop height was 65 cm or more, which increased by 30% or more compared with that of the glass without phase separation. In addition, in this application, the phase separation did not affect transparency and transmittance of the glass, and the obtained phase-separated glass was still transparent glass, with transmittance of 85% or more (0.7 mm thick) at a wavelength of 380~750 nm, and the transmittance did not obviously decrease compared with that of the glass without phase separation.

This application further provides tempered glass prepared from basic glass by sequentially performing phase separation and chemical strengthening, where the basic glass includes:

0~5 mol % of $Al_2O_3$;
30 mol %~65 mol % of $SiO_2$+$Al_2O_3$;
0~2 mol % of $P_2O_5$;
30 mol %~60 mol % of $B_2O_3$+$P_2O_5$;
0~7 mol % of $Li_2O$;
0~5 mol & of $K_2O$;
0~3 mol % of MgO;
0~3 mol % of CaO;
0~10 mol % of $Li_2O$+$K_2O$+MgO+CaO;
5 mol %~20 mol % of $Na_2O$+$Li_2O$+$K_2O$+MgO+CaO;
0~1 mol % of $ZrO_2$;
0~1 mol % of $GeO_2$;
0~1 mol % of $MnO_2$;
0~1 mol % of CuO;
0~1 mol % of $Re_2O_3$; and
0~3 mol % of $ZrO_2$+$GeO_2$+$MnO_2$+CuO+$Re_2O_3$.

In this application, the phase-separated glass obtained by using the foregoing technical solution is further chemically strengthened to form a compressive stress layer on a surface of the phase-separated glass, thereby further increasing a strength and a ball drop height of the glass. Experimental results show that after the compressive stress layer was formed on the surface of the foregoing phase-separated glass through chemical strengthening, the ball drop height of the phase-separated glass was at least 100 cm This application further provides a method for preparing the phase-separated glass in the foregoing technical solution and a method for preparing the tempered glass in the foregoing technical solution.

This application provides a housing of an electronic device, including the phase-separated glass or tempered glass in the foregoing technical solution. For example, the phase-separated glass or the tempered glass may be used as a material of a backplane of an electronic device, so that the electronic device has the advantages of beautiful appearance of glass material, high wear resistance, and the like, and improves anti-drop performance.

This application provides a display of an electronic device, including the phase-separated glass or tempered glass in the foregoing technical solution. For example, the phase-separated glass or the tempered glass may be used as a material of a cover of an electronic device, that is, as an external screen of the electronic device, so as to improve anti-drop performance of the electronic device and prolong the service life of the electronic device.

This application further provides an electronic device, including at least one of the housing in the foregoing technical solution and the display in the foregoing technical solution. The electronic device has advantages such as wear resistance, high cost performance, and support for wireless charging, and features good anti-drop performance, and the like.

It should be understood that the description of technical features, technical solutions, beneficial effects, or similar expressions in this application does not imply that all features and advantages can be achieved in any single embodiment. On the contrary, it can be understood that the description of features or beneficial effects means that specific technical features, technical solutions, or beneficial effects are included in at least one embodiment. Therefore, the description of technical features, technical solutions, or beneficial effects in this specification does not necessarily mean the same embodiment. Further, the technical features, technical solutions, and beneficial effects described in this embodiment can be further combined in any suitable manner. A person skilled in the art will understand that the embodiments can be implemented without one or more specific technical features, technical solutions, or beneficial effects of the specific embodiments. In other embodiments, additional technical features and beneficial effects can also be identified in specific embodiments that do not reflect all embodiments.

BRIEF DESCRIPTION OF DRAWINGS

To explain technical methods in embodiments of this application more clearly, the accompanying drawings required in embodiments will be briefly described below.

DESCRIPTION OF EMBODIMENTS

In an embodiment of this application, the word such as “example” or “for example” is used to represent giving an example, an illustration, or a description. In embodiments of this application, any embodiment or design solution described as “for example” or “such as” shall not be explained as being more preferred or advantageous than other embodiments or design solutions. To be precise, the use of the word such as “example” or “for example” is intended to present a related concept in a specific manner.

In this application, basic glass refers to glass prepared from raw materials through mixing, melting, and cooling and forming, which is used to distinguish from phase-separated glass obtained after phase separation and tempered glass obtained after ion exchange, and has no other special meaning.

In this application, a compressive stress is a value obtained by dividing a compressive load applied to a sample by an original cross-sectional area of the sample during a compression test, and is used to represent glass performance.

In this application, a backplane is a part of a housing of an electronic device, may also be referred to as a battery cover or a back cover, and is configured to protect a battery: and a cover is a part of a display of an electronic device, may also be referred to as an outer screen of the display, and is configured to protect an inner screen with a display function in the display.

Figure 1:
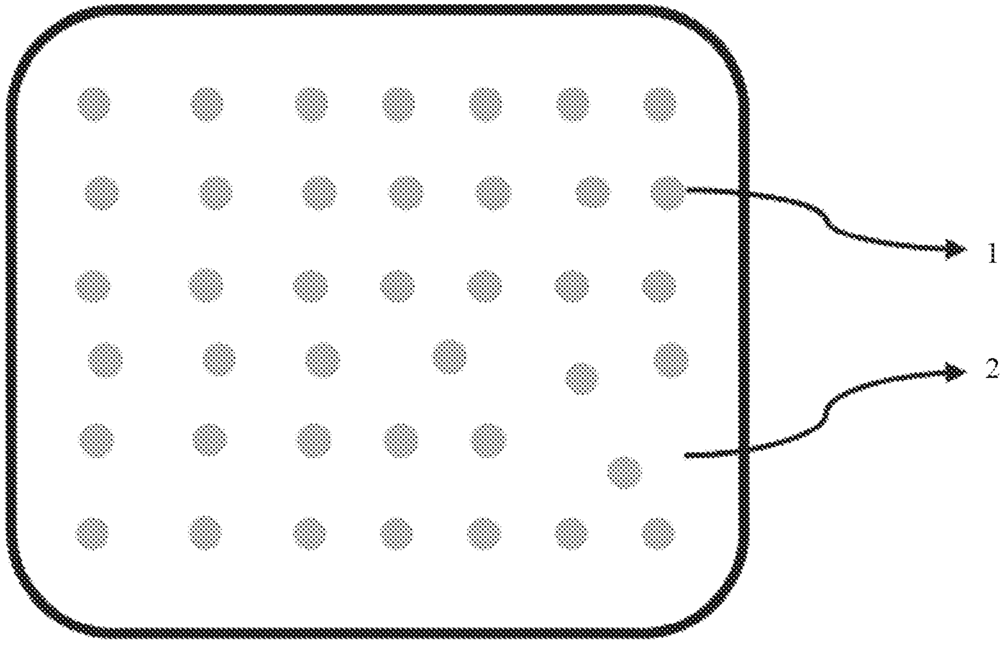
FIG. 1 is a schematic diagram of a morphology of glass-ceramics.
Figure 2:
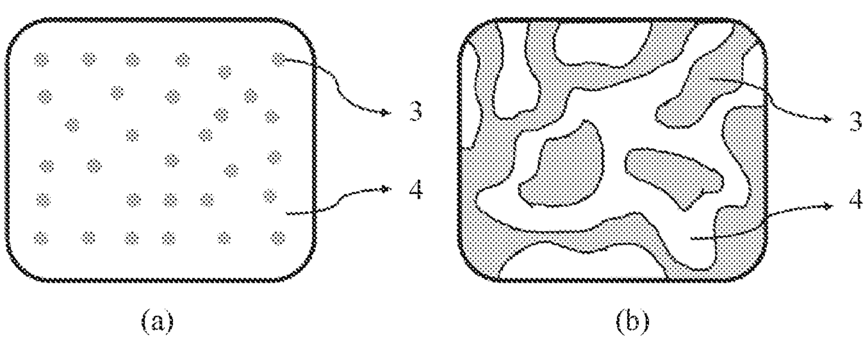
FIG. 2 is a schematic diagram of a morphology of phase-separated glass.

Glass-ceramics have a microcrystalline phase, as shown in FIG. 1, where “1” indicates a microcrystalline phase and “1” indicates a glass phase. The microcrystalline phase can inhibit crack propagation, to improve a mechanical strength such as a Young’s modulus and fracture toughness of glass. After chemical strengthening, mechanical properties of the glass, such as anti-drop performance, compression resistance, and scratch resistance, are further improved, so that the glass-ceramics can be applied in an electronic device. Phase separation of glass is a phenomenon in some glass systems, and means that different glass components start to disperse and gather separately due to the migration of internal particles when the glass is cooled or heat treated at a certain temperature, so as to form two glass phases with different chemical compositions. The morphology of glass may fall into two types, as shown in FIG. 2: One is a drip-shaped morphology shown in (a) in FIG. 2, that is, a first phase is dispersed in a matrix of a second phase in an independent spherical shape; and the other is a network morphology shown in (b) in FIG. 2, where “3” indicates the first phase and “4” indicates the second phase. The specific compositions of the first phase and the second phase are related to the glass composition, with feature sizes being usually several nanometers to several hundred nanometers. In the phase-separated glass, phase-separated droplet-shaped particles or a network structure can hinder and slow down stress concentration at a crack tip, and hinder the generation and propagation of micro-cracks, to improve fracture toughness of the glass, and then improve anti-drop performance of the glass, especially impact resistance of the glass. Therefore, the phase-separated glass can be applied to the field of terminal electronic devices such as mobile phones, watches, and slates.

The glass according to this application is prepared from basic glass through phase separation and chemical strengthening, may be used to produce a backplane or a cover of a mobile phone, and may also be used in electronic devices such as watches and slates.

In an embodiment, the basic glass includes the following components:

0~5 mol % of $Al_2O_3$;

30 mol %~65 mol % of $SiO_2$+$Al_2O_3$;

0~2 mol % of $P_2O_5$;

30 mol %~60 mol % of $B_2O_3$+$P_2O_5$;

0~7 mol % of $Li_2O$;

0~5 mol & of $K_2O$;

0~3 mol % of MgO;

0~3 mol % of CaO;

0~10 mol % of $Li_2O$+$K_2O$+MgO+CaO;

5 mol %~20 mol % of $Na_2O$+$Li_2O$+$K_2O$+MgO+CaO;

0~1 mol % of $ZrO_2$;

0~1 mol % of $GeO_2$;

0~1 mol % of $MnO_2$;

0~1 mol % of CuO;

0~1 mol % of $Re_2O_3$; and

0~3 mol % of $ZrO_2$+$GeO_2$+$MnO_2$+CuO+$Re_2O_3$.

$Re_2O_3$ includes:

0~1 mol % of $La_2O_3$;

0~1 mol % of $Ho_2O_3$;

0~1 mol % of $Y_2O_3$; and

0~1 mol % of $Nd_2O_3$.

In this embodiment $SiO_2$ and $B_2O_3$ are used as the main components of the basic glass, and jointly form a network structure of the basic glass, so that during subsequent phase separation, phase-separated glass including a silicon-rich glass phase and a boron-rich glass phase is formed, thereby improving anti-drop performance of the glass.

As a main glass former, $SiO_2$ endows the basic glass with better structural stability, chemical stability, mechanical properties, and formability. In an embodiment, the content of $SiO_2$ is 30 mol %~65 mol %. In an embodiment, the content of $SiO_2$ is 40 mol %~55 mol %. In an embodiment, the content of $SiO_2$ is 43 mol %~50 mol %.

In an embodiment, $Al_2O_3$ may be used to replace part of $SiO_2$; and as a network intermediate, $Al_2O_3$ can improve peeling stability and mechanical properties of the glass. In an embodiment, the content of $Al_2O_3$ is 0~5 mol %. In an embodiment, the content of $Al_2O_3$ is 0~5 mol %. In an embodiment, the content of $Al_2O_3$ is 0.5 mol %~3 mol %. In an embodiment, the content of $Al_2O_3$ is 1 mol %~2 mol %.

In an embodiment, the content of $SiO_2$+$Al_2O_3$ is 30 mol %~65 mol %. In an embodiment, the content of $SiO_2$+$Al_2O_3$ is 40 mol %~55 mol %. In an embodiment, the content of $SiO_2$+$Al_2O_3$ is 45 mol %~50 mol %.

As a network former of the basic glass, $B_2O_3$ can reduce a viscosity of the glass, which is conductive to production, and can promote and stabilize phase separation of the glass. In an embodiment, the content of $B_2O_3$ is 30 mol %~60 mol %. In an embodiment, the content of $B_2O_3$ is 32 mol %~50 mol %. In an embodiment, the content of $B_2O_3$ is 35 mol %~40 mol %.

In an embodiment, $P_2O_5$ may be used to replace part of $B_2O_3$; and as a glass former, $P_2O_5$ forms a layered network structure, which is conductive to ion diffusion in glass, promotes chemical strengthening, and can also promote phase separation of the glass. In an embodiment, the content of $P_2O_5$ is 0~3 mol %. In an embodiment, the content of $P_2O_5$ is 0~2 mol %.

In an embodiment, the content of $B_2O_3$+$P_2O_5$ is 30 mol %~60 mol %. In an embodiment, the content of $B_2O_3$+$P_2O_5$ is 35 mol %~50 mol %. In an embodiment, the content of $B_2O_3$+$P_2O_5$ is 40 mol %.

As one of necessary components, $Na_2O$ functions to make the glass contain enough $Na^+$ to exchange with $K^+$ in a molten potassium salt, so as to generate a high compressive stress on the glass surface. In an embodiment, the content of $Na_2O$ is 5 mol %~20 mol %. In an embodiment, the content of $Na_2O$ is 8 mol %~15 mol %. In an embodiment, the content of NaO is 10 mol %~13 mol %.

In an embodiment, one or more of $Li_2O$, $K_2O$, MgO, and CaO may be used to replace part of $Na_2O$. As a network outside body component, $Li_2O$ can reduce a melting viscosity layer of glass and accelerate melting and refining of the glass. In an embodiment, the content of $Li_2O$ is 0~7 mol %. In an embodiment, the content of $Li_2O$ is 1 mol %~5 mol %. In an embodiment, the content of $Li_2O$ is 2 mol %~3 mol %. $K_2O$ can improve a glass melting and refining effect. In an embodiment, the content of $K_2O$ is 0~5 mol %; and in an embodiment, the content of $K_2O$ is 1 mol %~3 mol %. As network outside body components of the glass, MgO and CaO can reduce a melting temperature of the glass, which is conductive to refining, and can promote separation and phase separation. In an embodiment, the content of MgO is 0~3 mol %. In an embodiment, the content of MgO is 0.1 mol %~3 mol %. In an embodiment, the content of MgO is 0.5 mol %~2 mol %. In an embodiment, the content of CaO is 0~3 mol %. In an embodiment, the content of CaO is 0.1 mol %~3 mol %. In an embodiment, the content of CaO is 1 mol %~2 mol %.

In an embodiment, the content of $Li_2O$+$K_2O$+MgO+CaO is 0~10 mol %. In an embodiment, the content of $Li_2O$+$K_2O$+MgO+CaO is 3 mol %~8 mol %. In an embodiment, the content of $Li_2O$+$K_2O$+MgO+CaO is 4.5 mol %~6 mol %.

In an embodiment, the content of $Na_2O$+$Li_2O$+$K_2O$+MgO+CaO is 5 mol %~20 mol %. In an embodiment, the content of $Na_2O$+$Li_2O$+$K_2$+MgO+CaO is 10 mol %~18 mol %. In an embodiment, the content of $Na_2O$+$Li_2O$+$K_2O$+MgO+CaO is 14.5 mol %~15 mol %.

$ZrO_2$ can increase the viscosity of glass, appropriately reduce a coefficient of thermal expansion, and improve alkali resistance of the glass. In an embodiment, the content of $ZrO_2$ is 0~1 mol %. In an embodiment, the content of $ZrO_2$ is 0~0.6 mol %. In an embodiment, the content of $ZrO_2$ is 0.2 mol %~0.6 mol %.

$GeO_2$ can increase a refractive index of glass and improve dispersion performance thereof. In an embodiment, the content of $GeO_2$ is 0~1 mol %. In an embodiment, the content of $GeO_2$ is 0~0.6 mol %. In an embodiment, the content of $GeO_2$ is 0.2 mol %~0.6 mol %.

As a colorant or decolorant, $MnO_2$ can change a color of glass, such as changing the color of glass to purple; or decolorize glass containing impurities such as iron or cobalt to make the glass colorless; or adjust a color of glass with another decolorant, such as $Nd_2O_3$ or CuO. In an embodiment, the content of $MnO_2$ is 0~1 mol %. In an embodiment, the content of $MnO_2$ is 0~0.6 mol %. In an embodiment, the content of $MnO_2$ is 0.2 mol %~0.6 mol %.

As a colorant, CuO can change the color of glass, such as changing glass to blue; or adjust the color of glass with another colorant, such as $MnO_2$ or $Nd_2O_3$. In an embodiment, the content of CuO is 0~1 mol %. In an embodiment, the content of CuO is 0 mol %~0.6 mol %. In an embodiment, the content of CuO is 0.2 mol %~0.6 mol %. In an embodiment, the content of CuO is 0.5 mol %.

$Re_2O_3$ is a rare earth oxide, and different rare earth oxides play different roles in glass. In an embodiment, $Re_2O_3$ includes:

0~1 mol % of $La_2O_3$;

0~1 mol % of $Ho_2O_3$;

0~1 mol % of $Y_2O_3$; and

0~1 mol % of $Nd_2O_3$.

$La_2O_3$ can improve chemical stability of glass, reduce a coefficient of thermal expansion, and improve processability of the glass. In an embodiment, the content of $La_2O_3$ is 0~1 mol %. In an embodiment, the content of $La_2O_3$ is 0.1 mol %~0.8 mol %. In an embodiment, the content of $La_2O_3$ is 0.2 mol %~0.6 mol %.

$Ho_2O_3$ can increase a strength of glass and reduce a coefficient of thermal expansion thereof. In an embodiment, the content of $Ho_2O_3$ is 0~1 mol %. In an embodiment, the content of $Ho_2O_3$ is 0.1 mol %~0.8 mol %. In an embodiment, the content of $Ho_2O_3$ is 0.2 mol %~0.6 mol %.

$Y_2O_3$ can increase a density of glass and improve mechanical properties thereof. In an embodiment, the content of $Y_2O_3$ is 0~1 mol %. In an embodiment, the content of $Y_2O_3$ is 0.1 mol %~0.8 mol %. In an embodiment, the content of $Y_2O_3$ is 0.2 mol %~0.6 mol %.

As a decolorant or colorant of glass, $Nd_2O_3$ can decolorize glass containing impurities such as iron, cobalt, and nickel, and lighten the color of the glass. Alternatively, as a colorant, $Nd_2O_3$ adjusts the color of the glass with another colorant, such as $MnO_2$ or CuO. In an embodiment, the content of $Nd_2O_3$ is 0~1 mol %. In an embodiment, the content of $Nd_2O_3$ is 0.1 mol %~0.8 mol %. In an embodiment, the content of $Nd_2O_3$ is 0.2 mol %~0.6 mol %.

In an embodiment, the content of $Re_2O_3$ is 0~1 mol %. In an embodiment, the content of $Re_2O_3$ is 0.1 mol %~0.8 mol %. In an embodiment, the content of $Re_2O_3$ is 0.2 mol %~0.6 mol %.

In an embodiment, the content of $ZrO_2+GeO_2+MnO_2+CuO+Re_2O_3$ is 0~3 mol %. In an embodiment, the content of $ZrO_2+GeO_2+MnO_2+CuO+Re_2O_3$ is 0.5 mol %~2 mol %. In an embodiment, the content of $ZrO_2+GeO_2+MnO_2+CuO+Re_2O_3$ is 1 mol %~1.5 mol %.

In an embodiment, the basic glass is transparent glass, with transmittance of 90% or more (0.7 mm thick) at a wavelength of 380~750 nm.

A method for preparing the basic glass is not specially limited in this application. For example, the basic glass can be obtained by uniformly mixing and stirring the raw materials, heating to fully melting, and cooling and forming. In an embodiment, melting is performed at 1400~1600° C. for a melting holding time of 1.5~4 h. It can be understood that during the preparation of the basic glass, in the melting process, homogenization can be performed by using a method such as deaeration or stirring. A specific method for cooling and forming includes, but is not limited to, forming plate glass by using a float process, a downdraw process, a pressing process or a flat rolling process, or forming bulk glass through casting.

The raw materials used for preparing the basic glass according to the present invention may be an oxide, a composite oxide, a carbonate, a hydroxide, a hydrate thereof, and the like. For example, the oxide may be silica sand ($SiO_2$), boron oxide ($B_2O_3$), zirconia ($ZrO_2$), and the like; the composite oxide may be borax $Na_2B_4O_5(OH)_4 \cdot 8H_2O$), sodium metaphosphate ($NaPO_3$), and the like; the carbonate may be sodium carbonate and potassium carbonate; the hydroxide may be aluminum hydroxide, and the like; and the hydrate may be boric acid, phosphoric acid, and the like.

After the basic glass is obtained, phase separation is performed on the basic glass, so that the alkali borosilicate basic glass is phase-separated into two-phase mixed phase-separated glass including an alkali-boron-rich phase and a silicon phase, thereby improving fracture toughness and anti-drop performance of the glass. In an embodiment, the phase separation is specifically to perform heat treatment on the basic glass, such as keeping the basic glass at 550~600° C. for 5~15 h. In an embodiment, the heat treatment is performed at 570~580° C. for 5~10 h. During the heat treatment, the alkali-boron phase and the silicon phase of the glass are separated from each other to form transparent phase-separated glass with a drip-shaped structure and/or a network structure, that is, the alkali-boron-rich separated phase is dispersed in a matrix of the silicon-rich phase in an independent spherical shape; or the alkali-boron-rich separated phase and the silicon-rich separated phase form a network structure. The different glass phases can hinder micro-cracks in the glass from propagating, thereby improving mechanical properties such as fracture toughness of the glass and then improving anti-drop performance of the glass. Experimental results show that after phase separation, the glass according to the present invention had fracture toughness of 1.0 $MPa \cdot m^{1/2}$ or more, which was improved by 20% or more; and a ball drop height was 65 cm or more, which increased by 30% or more.

Figure 3:
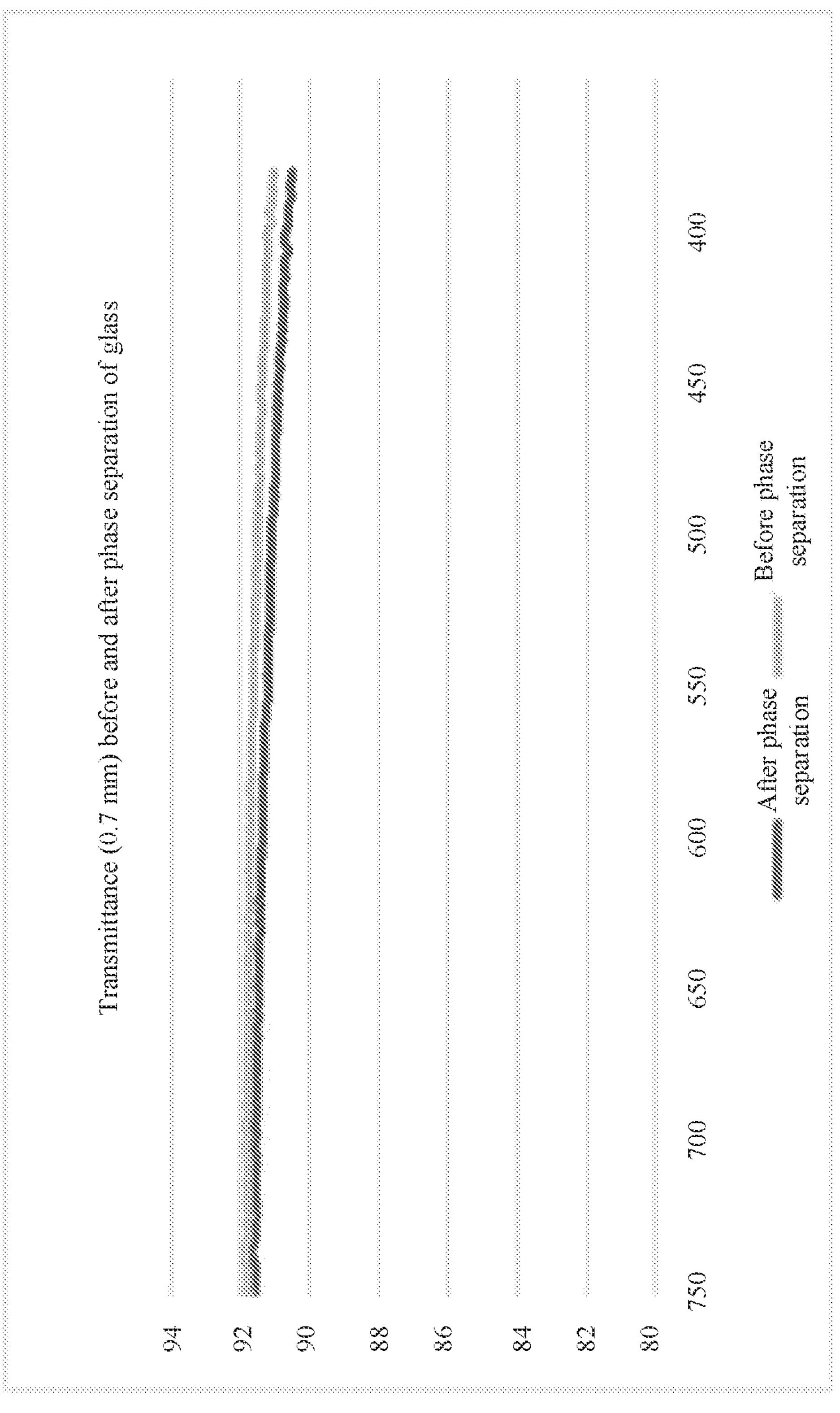
FIG. 3 shows transmittance curves of glass according to Embodiment 1-1 of the present invention and Comparative Example 1.

In addition, in the present invention, the phase separation did not affect transparency and transmittance of the glass, and the obtained phase-separated glass was still transparent glass, with transmittance of 85% or more, preferably 90% or more, (0.7 mm thick) at a wavelength of 380~750 nm, and the transmittance did not obviously decrease. FIG. 3 shows transmittance curves of glass according to Embodiment 1-1 of the present invention and Comparative Example 1.

The obtained phase-separated glass according to the present invention may be used to produce a cover or a backplane material of an electronic device, such as a. 2D glass backplane, a 3D glass backplane, a 2.5D glass backplane, a glass cover or the like of a mobile phone.

In an embodiment, after the phase-separated glass is obtained, the phase-separated glass may be further chemically strengthened to further improve properties such as fracture toughness of the glass. Specifically, after being obtained, the phase-separated glass is processed into a desired shape based on use thereof and then undergoes chemical strengthening or directly undergoes chemical strengthening. For example, the phase-separated glass undergoes cuffing, CNC shape processing, and polishing to obtain a planar mobile phone backplane; or the phase-separated glass undergoes cutting, CNC shape processing, 3D hot bending, and polishing to obtain a 3D mobile phone backplane, or the like. The 3D hot bending is to perform hot pressing on the CNC-processed glass raw materials by using a hot bending machine and a molding die, so that the glass is bent into a required shape, that is, 3D glass modeling.

After being obtained, the phase-separated glass with the desired shape is chemically strengthened to form a compressive stress layer on a surface of the glass, thereby improving the strength of the glass. The chemical strengthening may be performed through one ion exchange or two ion exchanges, to form an ion exchange layer, which is not specially limited in this application.

Specifically, the one ion exchange includes: performing ion exchange on the phase-separated glass in a molten potassium salt. In an embodiment, the molten potassium salt may be potassium nitrate, and the ion exchange is performed at 400° C.~500° C. for 4-7 h. In an embodiment, the ion exchange is performed at 450° C. for 6 h.

The two ion exchanges include: performing the first ion exchange on the phase-separated glass in a first molten salt, and then performing the second ion exchange in a second molten salt. In an embodiment, the first molten salt is a mixed molten salt of potassium nitrate and sodium nitrate, and the first ion exchange is performed at 400° C.~600° C. for 5~8 h; and the second molten salt is potassium nitrate, and the second ion exchange is performed at 400° C.~500° C. for 1~3 h.

After the chemical strengthening, the ball drop height of the obtained tempered glass can reach 100 cm or more.

After the chemical strengthening, subsequent processing such as transfer printing and film coating (AF) can be performed on the glass based on use thereof, which is not specifically limited in this application.

The glass according to this application may be used to produce a cover of a housing of an electronic device or a backplane of a display of an electronic device, so that the cover or the backplane has the advantages of wear resistance, high cost performance, support for wireless charging, and the like, and features anti-drop performance, and the like.

The electronic device in this application may be any device with communication and storage functions, such as a smartphone, a cellular phone, a cordless phone, a session initiation protocol (Session Initiation Protocol. SIP) phone, a tablet computer, a personal digital assistant (Personal Digital Assistant, PAD), a notebook computer, a digital camera, an e-book reader, a portable multimedia player, a handheld device with a wireless communication function, a computing device or another processing device connected to a wireless modem, an in-vehicle device, a wearable device, and a 5G terminal device, which is not limited in the embodiments of this application.

The phase-separated glass and the preparation method thereof, the tempered glass and the preparation method thereof, the housing of an electronic device, the display of an electronic device, and the electronic device according to this application are described in detail below with reference to embodiments.

Glass was prepared based on a formula and process parameters shown in Table 1. A specific method includes:

placing raw material such as $SiO_2$, $Al(OH)_3$, $H_3BO_3$, $Na_2CO_3$, $Li_2CO_3$, $CaCO_3$, $ZrO_2$, CuO, $P_2O_5$, and MgO in a mortar, fully and uniformly stirring to obtain a mixed batch, then transferring the mixed batch to a high-temperature furnace at 1400~1600° C., keeping the temperature for 1.5~2 h, so that the mixed batch is fully molten, and then cooling and forming the molten mixed batch to obtain alkali borosilicate basic glass;

placing the basic glass into a resistance furnace for heat treatment to implement phase separation of the basic glass, so as to obtain two-phase mixed transparent phase-separated glass including an alkali-boron-rich phase and a silicon phase; and cutting and then immersing the two-phase mixed transparent phase-separated glass in molten $KNO_3$ at 450° C. for ion exchange for 6 h, to obtain chemically strengthened glass.

Performance of the glass was tested, and results are shown in Table 1. A test method was as follows:

For the test of fracture toughness, referring to the national standard GB/T 37900-2019 (Test method of hardness and fracture toughness for ultra-thin glass), samples were tested by using a low-load Vickers hardness indentation method. It should be noted that in each embodiment, when the fracture toughness of the samples was tested after chemical strengthening, a 10 Kgf pressure (a maximum pressure supported by a testing device) was applied to each sample, but still no crack appeared, so that a fracture toughness value after chemical strengthening was not counted. It can be learned that the fracture toughness of the samples after chemical strengthening was much greater than that before the chemical strengthening.

A surface stress of glass and a depth of an ion exchange layer were measured by a glass surface stress meter FSM-6000LEUV, SLP-2000. During testing, a refractive index of each sample was set to 1.47, and an optical elasticity constant of the sample was set at to 65 nm/cm/MPa.

For a ball drop test, referring to the national standard GB/T 39814-2021 (Test method for impact strength of ultrathin glass), the sample was processed to 150 mm×75 mm×0.55 mm. After two surfaces were polished, a 32 g steel ball was used to drop from a specified height, that is, a maximum ball drop test height for which the sample could bear an impact withstand without fracturing.

TABLE 1

Formulas, process parameters, and performance test results of glass prepared in the embodiments of this application and comparative examples

| | Item | Comparative Example 1 | Embodiment 1-1 | Embodiment 1-2 | Comparative Example 2 | Embodiment 2-1 | Embodiment 2-2 |
|---|---|---|---|---|---|---|---|
| Composition (mol %) | $SiO_2$ | 45 | 45 | 45 | 43 | 43 | 43 |
| | $Al_2O_3$ | — | — | — | 2 | 2 | 2 |
| | $B_2O_3$ | 40 | 40 | 40 | 38 | 38 | 38 |
| | $P_2O_5$ | — | — | — | 2 | 2 | 2 |
| | $Na_2O$ | 13 | 13 | 13 | 10 | 10 | 10 |
| | $Li_2O$ | — | — | — | 3 | 3 | 3 |
| | CaO | 2 | 2 | 2 | 1 | 1 | 1 |
| | MgO | — | — | — | 1 | 1 | 1 |
| | $ZrO_2$ | — | — | — | — | — | — |
| | CuO | — | — | — | — | — | — |
| Color before phase separation | | Colorless and transparent | Colorless and transparent | Colorless and transparent | Colorless and transparent | Colorless and transparent | Colorless and transparent |
| Transmittance before phase separation (380~750 nm, %) | | >90.5 | >90.5 | >90.5 | >90 | >90 | >90 |
| Phase separation | Temperature (° C.) | — | 570 | 570 | — | 570 | 570 |
| | Time (h) | — | 5 | 10 | — | 5 | 10 |
| Color after phase separation | | — | Colorless and transparent | Colorless and transparent | — | Colorless and transparent | Colorless and transparent |
| Transmittance after phase separation (380~750 nm, %) | | — | >90 | >89.5 | — | >89 | >88.5 |
| Before ion exchange | Fracture toughness ($MPa \cdot m^{1/2}$) | 1.02 | 1.21 | 1.23 | 1.00 | 1.18 | 1.18 |
| | Ball drop height (mm) | 630 | 820 | 840 | 520 | 720 | 730 |

TABLE 1-continued

Formulas, process parameters, and performance test results of glass prepared in the embodiments of this application and comparative examples

| | | | | | | | |
|---|---|---|---|---|---|---|---|
| After ion exchange (450° C./6 h) | Surface stress (MPa) | — | 394 | 395 | — | 412 | 410 |
| | Depth of an ion exchange layer (μm) | — | 23 | 23 | — | 26 | 24 |
| | Ball drop height (mm) | — | 1320 | 1350 | — | 1150 | 1170 |

| Item | | Comparative Example 3 3 | Embodiment 3-1 | Embodiment 3-2 | Comparative Example 4 4 | Embodiment 4-1 |
|---|---|---|---|---|---|---|
| Composition (mol %) | $SiO_2$ | 50 | 50 | 50 | 49 | 49 |
| | $Al_2O_3$ | — | — | — | 1 | 1 |
| | $B_2O_3$ | 35 | 35 | 35 | 35 | 35 |
| | $P_2O_5$ | — | — | — | — | — |
| | $Na_2O$ | 10 | 10 | 10 | 10 | 10 |
| | $Li_2O$ | 3 | 3 | 3 | 2 | 2 |
| | CaO | — | — | — | 2 | 2 |
| | MgO | 2 | 2 | 2 | 0.5 | 0.5 |
| | $ZrO_2$ | — | — | — | 0.5 | 0.5 |
| | CuO | — | — | — | — | — |
| Color before phase separation | | Colorless and transparent | Colorless and transparent | Colorless and transparent | Colorless and transparent | Colorless and transparent |
| Transmittance before phase separation (380~750 nm, %) | | >90.5 | >90.5 | >90.5 | >90.5 | >90.5 |
| Phase separation | Temperature (° C.) | — | 580 | 580 | — | 580 |
| | Time (h) | — | 5 | 10 | — | 5 |
| Color after phase separation | | — | Colorless and transparent | Colorless and transparent | — | Colorless and transparent |
| Transmittance after phase separation (380~750 nm, %) | | — | >90 | >89 | — | >90 |
| Before ion exchange | Fracture toughness (MPa · $m^{1/2}$) | 0.85 | 1.06 | 1.07 | 0.88 | 1.09 |
| | Ball drop height (mm) | 450 | 670 | 680 | 500 | 710 |
| After ion exchange (450° C./6 h) | Surface stress (MPa) | — | 403 | 405 | — | 403 |
| | Depth of an ion exchange layer (μm) | — | 25 | 24 | — | 25 |
| | Ball drop height (mm) | — | 1070 | 1090 | — | 1140 |

| Item | | Embodiment 4-2 | Comparative Embodiment 5 5 | Embodiment 5-1 | Embodiment 5-2 |
|---|---|---|---|---|---|
| Composition (mol %) | $SiO_2$ | 49 | 49 | 49 | 49 |
| | $Al_2O_3$ | 1 | 1 | 1 | 1 |
| | $B_2O_3$ | 35 | 35 | 35 | 35 |
| | $P_2O_5$ | — | — | — | — |
| | $Na_2O$ | 10 | 10 | 10 | 10 |
| | $Li_2O$ | 2 | 2 | 2 | 2 |
| | CaO | 2 | 2 | 2 | 2 |
| | MgO | 0.5 | 0.5 | 0.5 | 0.5 |
| | $ZrO_2$ | 0.5 | — | — | — |
| | CuO | — | 0.5 | 0.5 | 0.5 |
| Color before phase separation | | Colorless and transparent | Blue and transparent | Blue and transparent | Blue and transparent |
| Transmittance before phase separation (380~750 nm, %) | | >90.5 | — | — | — |
| Phase separation | Temperature (° C.) | 580 | — | 570 | 570 |
| | Time (h) | 10 | — | 5 | 10 |
| Color after phase separation | | Colorless and transparent | — | Blue and transparent | Blue and transparent |

TABLE 1-continued

Formulas, process parameters, and performance test results of glass prepared in the embodiments of this application and comparative examples

| | | | | | |
|---|---|---|---|---|---|
| Transmittance after phase separation (380~750 nm, %) | | >89 | | | |
| Before ion exchange | Fracture toughness ($MPa \cdot m^{1/2}$) | 1.08 | 0.86 | 1.07 | 1.07 |
| | Ball drop height (mm) | 700 | 530 | 690 | 720 |
| After ion exchange (450° C./6 h) | Surface stress (MPa) | 404 | — | 404 | 402 |
| | Depth of an ion exchange layer (μm) | 24 | — | 26 | 25 |
| | Ball drop height (mm) | 1120 | — | 1100 | 1130 |

It can be learned from Table 1 that the transmittance of the glass according to the present invention at a wavelength of 380~750 nm did not obviously decrease after phase separation, and the glass was still transparent glass, which does not affect performance of the glass as a cover or a backplane of an electronic device. In addition, after phase separation, the fracture toughness and the ball drop height were obviously increased, which improves anti-drop performance of the glass as a cover or a backplane of an electronic device, especially a mobile phone. Further, after the glass was chemically strengthened, the fracture toughness and ball drop height of the glass were further increased, and anti-drop performance of the glass was improved again. When the glass is used to produce a cover or a backplane of an electronic device, the service life of the electronic device can be prolonged.

The foregoing descriptions are merely specific implementations of this application, but are not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. Phase-separated glass, wherein the phase-separated glass comprises:

43~50 mol % of $SiO_2$;
1~5 mol % of $Al_2O_3$;
32~50 mol % of $B_2O_3$;
8~15 mol % of $Na_2O$;
2~3 mol % of $P_2O_5$;
0~7 mol % of $Li_2O$;
0~5 mol % of $K_2O$;
0~3 mol % of MgO;
0~3 mol % of CaO;
0~1 mol % of $ZrO_2$;
0~1 mol % of $GeO_2$;
0~1 mol % of $MnO_2$;
0~1 mol % of CuO;
0~1 mol % of $Re_2O_3$;
45~50 mol % of $SiO_2$+$Al_2O_3$;
35~50 mol % of $B_2O_3$+$P_2O_5$;
0~10 mol % of $Li_2O$+$K_2O$+MgO+CaO;
5 mol %~20 mol % of $Na_2O$+$Li_2O$+$K_2O$+MgO+CaO;
0~3 mol % of $ZrO_2$+$GeO_2$+$MnO_2$+CuO+$Re_2O_3$; and
an alkali-boron-rich separated phase and a silicon-rich separated phase existing following completion of manufacturing of the phase-separated glass, wherein a surface of the phase-separated glass is provided with an ion exchange layer.

2. The phase-separated glass of claim 1, wherein the phase-separated glass comprises:

43~50 mol % of $SiO_2$;
1~5 mol % of $Al_2O_3$;
32~50 mol % $B_2O_3$;
8~15 mol % of $Na_2O$;
2~3 mol % of $P_2O_5$;
1 mol %~5 mol % of $Li_2O$;
0.1 mol %~3 mol % of MgO;
0.1 mol %~3 mol % of CaO;
0~0.6 mol % of $ZrO_2$;
0~0.6 mol % of CuO;
45~50 mol % of $SiO_2$+$Al_2O_3$;
35 mol %~50 mol % of $B_2O_3$+$P_2O_5$;
3 mol %~8 mol % of $Li_2O$+MgO+CaO; and
10 mol %~18 mol % of $Na_2O$+$Li_2O$+$K_2O$+MgO+CaO.

3. The phase-separated glass of claim 1, wherein the phase-separated glass comprises 1~2 mol % of $Al_2O_3$.

4. The phase-separated glass of claim 1, wherein the phase-separated glass comprises 35~50 mol % $B_2O_3$.

5. The phase-separated glass of claim 1, wherein the phase-separated glass comprises 10~13 mol % of $Na_2O$.

6. The phase-separated glass of claim 1, wherein $Re_2O_3$ comprises:

0~1 mol % of $La_2O_3$;
0~1 mol % of $Ho_2O_3$;
0~1 mol % of $Y_2O_3$; and
0~1 mol % of $Nd_2O_3$.

7. The phase-separated glass of claim 1, wherein either a) the alkali-boron-rich separated phase is dispersed in a matrix of the silicon-rich separated phase in an independent spherical shape, or b) the alkali-boron-rich separated phase and the silicon-rich separated phase form a network structure.

8. The phase-separated glass of claim 7, wherein in a ball drop test, a ball drop height is 65 cm or more.

9. The phase-separated glass of claim 7, wherein a fracture toughness of the phase-separated glass is 1.0 Mpa·m½$^{1/2}$ or more.

10. The phase-separated glass of claim 1, wherein the phase-separated glass has a transmittance of 85% or more at a wavelength of 380~750 nm.

11. The phase-separated glass of claim 1, wherein a surface of the phase-separated glass is provided with a compressive stress layer.

12. The phase-separated glass of claim 11, wherein the phase-separated glass has a surface stress of 350~450 MPa.

13. The phase-separated glass of claim 11, wherein in a ball drop test, a ball drop height is 100 cm or more.

14. A method for preparing a phase-separated glass, comprising performing phase separation on basic glass to obtain the phase-separated glass, wherein the phase-separated glass comprises:

43~50 mol % of $SiO_2$;
1~5 mol % of $Al_2O_3$;
32~50 mol % of $B_2O_3$;
8~15 mol % of $Na_2O$;
2~3 mol % of $P_2O_5$;
0~7 mol % of $Li_2O$;
0~5 mol % of $K_2O$;
0~3 mol % of MgO;
0~3 mol % of CaO;
0~1 mol % of $ZrO_2$;
0~1 mol % of $GeO_2$;
0~1 mol % of $MnO_2$;
0~1 mol % of CuO;
0~1 mol % of $Re_2O_3$;
45~50 mol % of $SiO_2+Al_2O_3$;
35~50 mol % of $B_2O_3+P_2O_5$;
0~10 mol % of $Li_2O+K_2O+MgO+CaO$;
5 mol %~20 mol % of $Na_2O+Li_2O+K_2O+MgO+CaO$;
0~3 mol % of $ZrO_2+GeO_2+MnO_2+CuO+Re_2O_3$; and
an alkali-boron-rich separated phase and a silicon-rich separated phase,
wherein a surface of the phase-separated glass is provided with a compressive stress layer.

15. The method of claim 14, wherein performing phase separation comprises keeping the basic glass at 550~600° C. for 5~15 h.

16. The method of claim 14, further comprising performing a chemical strengthening process to obtain the phase-separated glass.

17. The method of claim 16, wherein the chemical strengthening process comprises either a) performing ion exchange on the basic glass in a molten potassium salt, or b) performing one ion exchange on the basic glass in a first molten salt, and then performing two ion exchanges in a second molten salt, wherein the first molten salt is a mixed molten salt of potassium nitrate and sodium nitrate, and the second molten salt is potassium nitrate.

18. An electronic device, comprising a phase-separated glass that comprises:

43~50 mol % of $SiO_2$;
1~5 mol % of $Al_2O_3$;
32~50 mol % of $B_2O_3$;
8~15 mol % of $Na_2O$;
2~3 mol % of $P_2O_5$;
0~7 mol % of $Li_2O$;
0~5 mol % of $K_2O$;
0~3 mol % of MgO;
0~3 mol % of CaO;
0~1 mol % of $ZrO_2$;
0~1 mol % of $GeO_2$;
0~1 mol % of $MnO_2$;
0~1 mol % of CuO;
0~1 mol % of $Re_2O_3$;
45~50 mol % of $SiO_2+Al_2O_3$;
35~50 mol % of $B_2O_3+P_2O_5$;
0~10 mol % of $Li_2O+K_2O+MgO+CaO$;
5 mol %~20 mol % of $Na_2O+Li_2O+K_2O+MgO+CaO$;
0~3 mol % of $ZrO_2+GeO_2+MnO_2+CuO+Re_2O_3$; and
an alkali-boron-rich separated phase and a silicon-rich separated phase.

19. The electronic device of claim 18, wherein either a) the phase-separated glass is a cover of a housing of the electronic device, or b) the phase-separated glass is a backplane of a display of the electronic device.

* * * * *